US005546457A

United States Patent [19]
Tomura et al.

[11] Patent Number: 5,546,457
[45] Date of Patent: *Aug. 13, 1996

[54] TERMINAL APPARATUS

[75] Inventors: Masashi Tomura; Hisamitsu Takagi, both of Kawasaki, Japan

[73] Assignee: Fujitsu Limited, Kawasaki, Japan

[ * ] Notice: The term of this patent shall not extend beyond the expiration date of Pat. No. 5,235,636.

[21] Appl. No.: 442,996

[22] Filed: May 16, 1995

Related U.S. Application Data

[63] Continuation of Ser. No. 210,737, Mar. 18, 1994, abandoned, which is a continuation of Ser. No. 764,722, Sep. 24, 1991, abandoned.

[30] Foreign Application Priority Data

May 31, 1991 [JP] Japan .................................. 3-129111

[51] Int. Cl.⁶ .................................................. H04M 1/23
[52] U.S. Cl. .......................... 379/368; 379/369; 379/440; 379/428; 379/396
[58] Field of Search .................................. 379/368, 369, 379/370, 428, 429, 433, 435, 440, 395, 396

[56] References Cited

U.S. PATENT DOCUMENTS

| 4,124,879 | 11/1978 | Schoemer | 362/26 |
| 4,343,975 | 8/1982 | Sado | 200/314 |
| 4,349,705 | 9/1982 | Kuhfus | 379/368 X |
| 4,734,679 | 3/1988 | Haskins | 379/368 X |
| 4,845,748 | 7/1989 | Bohannon | 379/428 X |
| 4,866,764 | 9/1989 | Baker, III | 379/355 |
| 5,235,636 | 8/1993 | Takagi et al. | 379/368 |
| 5,237,607 | 8/1993 | Diamantis | 379/368 |

FOREIGN PATENT DOCUMENTS 1-134827  5/1989  Japan .

Primary Examiner—Jeffery Hofsass
Assistant Examiner—Jacques M. Saint-Surin
Attorney, Agent, or Firm—Staas & Halsey

[57] ABSTRACT

A telephone having a plurality of key tops and a small number of light sources for illuminating the key tops with a thin construction. A switch panel formed of a transparent material is mounted on a case of the telephone. The switch panel has a plurality of holes through which the key tops of a key top sheet are respectively inserted. An opaque film is formed on an outer surface of the switch panel. A plurality of conductive contracts are formed on a lower surface of the key top sheet at positions corresponding to the respective key tops. A plurality of switch patterns are formed on a printed circuit board so as to respectively face the conductive contacts. With this construction, the switch panel functions as a light guiding board, thereby efficiently illuminating the plurality of key tops by means of the small number of light sources such as LEDs.

5 Claims, 6 Drawing Sheets

5,546,457

TERMINAL APPARATUS

This application is continuation, of application Ser. No. 08/210,737, filed Mar. 18, 1994, now abandoned, which is a continuation of application Ser. No. 07/764,722, filed Sept. 24, 1991, now abandoned.

BACKGROUND OF THE INVENTION

1. Field of the Invention

The present invention relates to a structure of a terminal apparatus as a portable telephone and a cordless telephone.

2. Description of the Prior Art

An ultimate object of communication is, of course, to enable intention or information to be transmitted or exchanged at once anytime, from anywhere, and by anybody. In addition to a conventional intercommunication between fixed points, a mobile communication has been gradually developed. The mobile communication means a communication between a mobile body such as ship, automobile, or airplane (including a human being) and a fixed point such as home or office, and also means an intercommunication between two mobile bodies. In recent years, a portable telephone or a cordless telephone as a kind of means for carrying out the mobile communication has been extensively developed.

The portable telephone is provided with a switch section having a dialing function. It is desired that a plurality of key tops provided in the switch section can be illuminated in consideration of use in the dark. It would be advantageous from the viewpoints of power saving and compactness to uniformly illuminate a plurality of key tops by means of a small number of light sources.

As a technique for illuminating a plurality of key tops by means of a small number of light sources, it is known in the art that a light guiding board for back lighting is provided independently of a telephone case, and light from the light sources is supplied through this light guiding board to the plurality of key tops.

However, in the conventional structure employing the light guiding board for back lighting, it is necessary to mount the transparent light guiding board on the telephone case independently thereof. It is therefore inconvenient especially in the portable telephone required to have a thin construction.

SUMMARY OF THE INVENTION

It is therefore an object of the present invention to provide a terminal apparatus with a thin construction having a plurality of key tops which can be illuminated by a small number of light sources.

In accordance with an aspect of the present invention, there is provided a terminal apparatus comprising a case; a printed circuit board accommodated in said case and formed with a plurality of switch patterns; a switch panel formed of a transparent material and fixed to said case, said switch panel having a plurality of holes at positions corresponding to said plurality of switch patterns; an opaque film provided on an outer surface of said switch panel so as to be integrated with said switch panel; a key top sheet having a plurality of key tops and mounted on said printed circuit board with said key tops respectively inserted through said holes of said switch panel; a plurality of conductive contacts provided on a lower surface of said key top sheet at positions corresponding to said key tops so as to respectively face said switch patterns with a predetermined distance defined; and a plurality of light sources for introducing light into said switch panel.

In this structure of the terminal apparatus according to the present invention, the switch panel fixed to the case of the terminal apparatus to constitute a part of the case is formed of a transparent material. The outer surface of the switch panel is covered with the opaque film. Accordingly, the switch panel itself, that is, the case of the terminal apparatus functions as a light guiding board. Unlike the conventional structure such that the case is formed independently of the light guiding board, the present invention enables the construction of the terminal apparatus to be made thin. Moreover, as the outer surface of the switch panel is covered with the opaque film, a user feels no discomfort on the appearance of the terminal apparatus.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
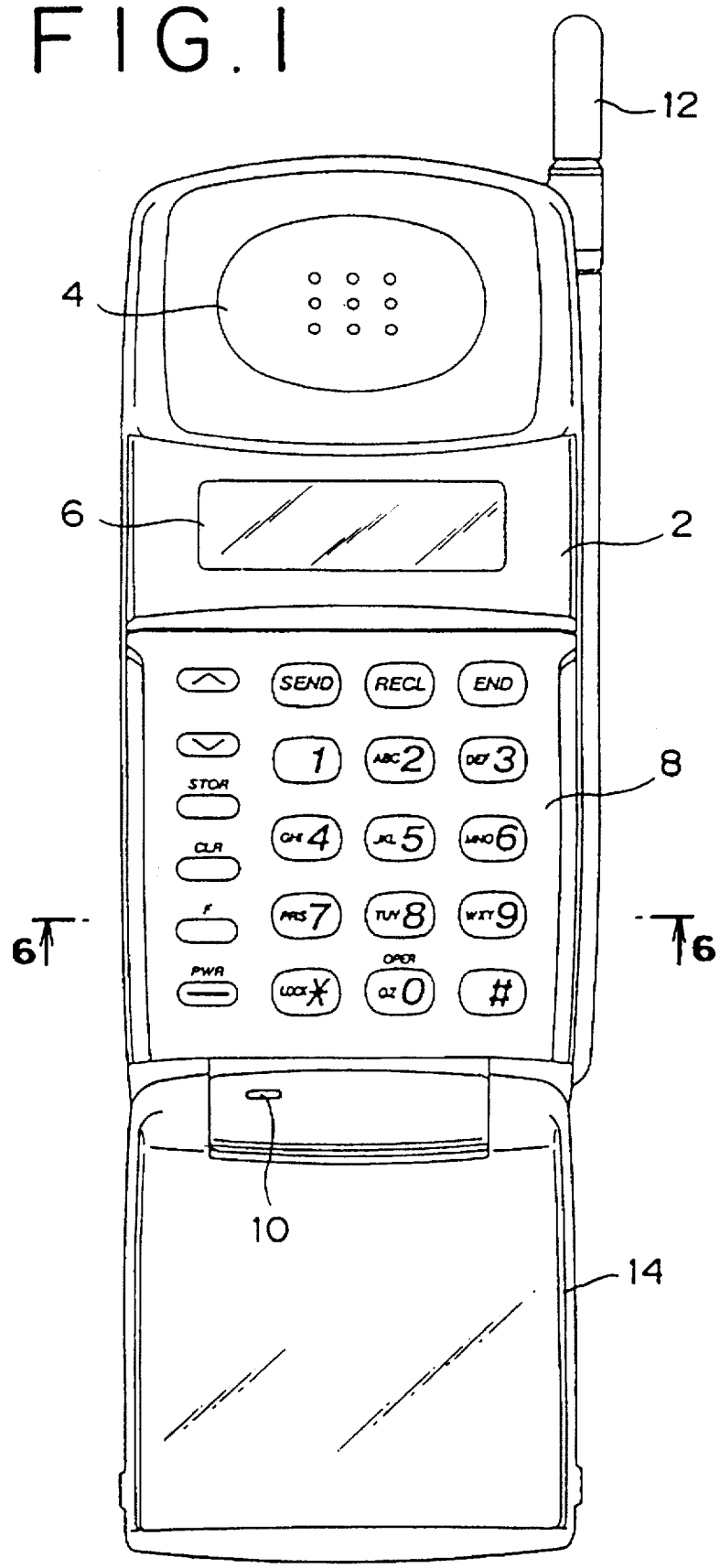
FIG. 1 is a plan view of a portable telephone according to a preferred embodiment of the present invention.
Figure 2:
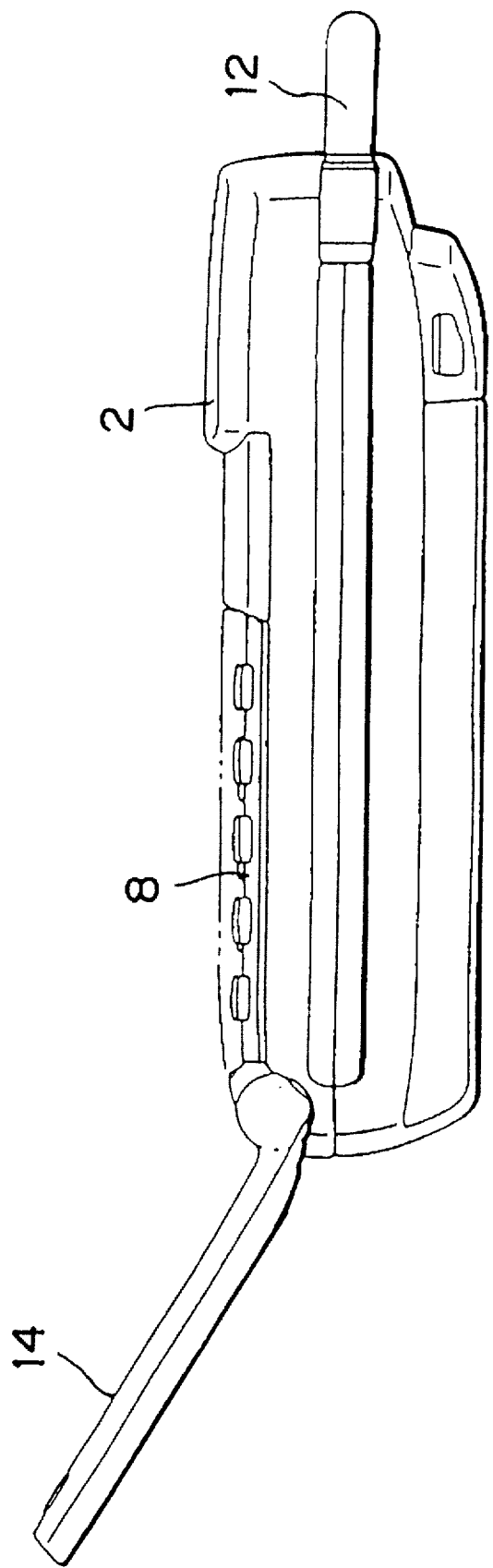
FIG. 2 is a side view of the portable telephone shown in FIG. 1.

Referring now to FIGS. 1 and 2, reference numeral 2 denotes a case of a portable telephone according to a preferred embodiment of the present invention. A receiver section 4 accommodating a speaker therein is provided at an upper end portion of the case 2. A display section 6 such as a liquid crystal display and a switch section 8 having a dialing function or the like are provided at a middle portion of the case 2. A transmitter section 10 accommodating a microphone therein is provided at a left end of a lower end portion of the case 2.

An extendable antenna 12 is mounted on a right side surface of the case 2. A cover 14 is rotatably mounted to the lower end portion of the case 2. The cover 14 functions to cover the switch section 8 when closed and also functions as a voice reflecting and collecting board for the transmitter section 10 when opened.

Figure 3:
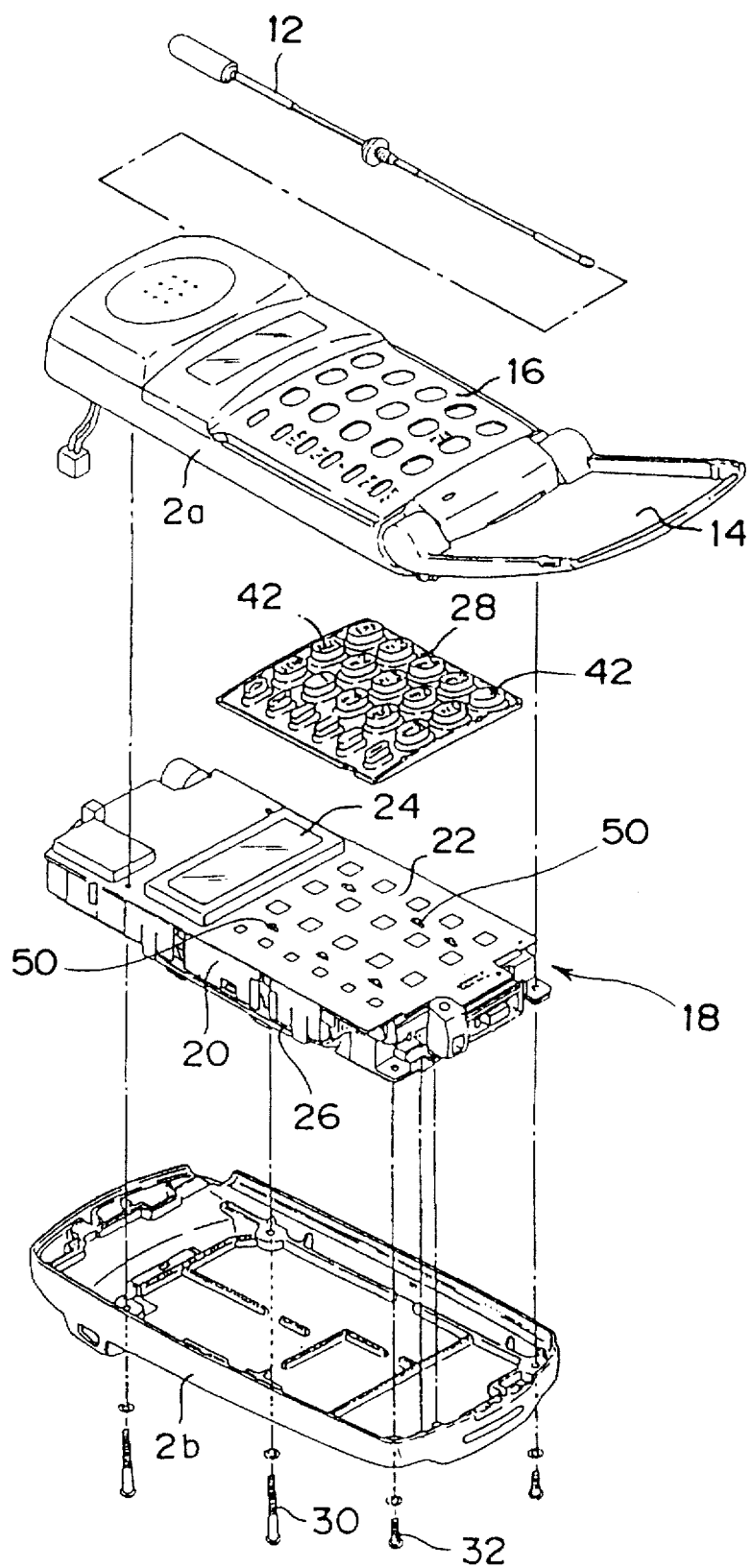
FIG. 3 is an exploded perspective view of the portable telephone shown in FIG. 1.
Figure 4:
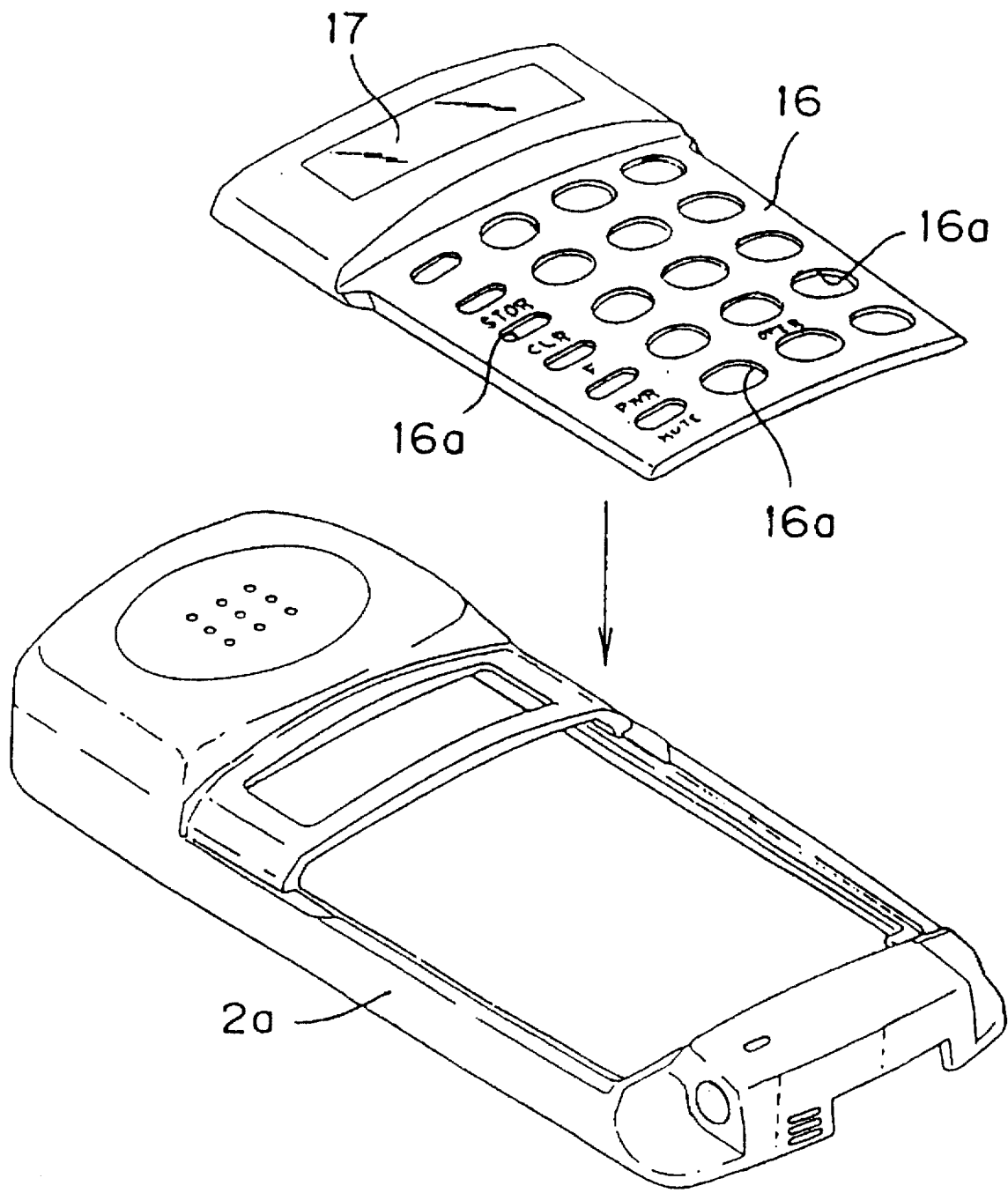
FIG. 4 is an exploded perspective view of an assembly of a front case and a switch panel.

Referring to FIG. 3, there is shown an exploded perspective view of the portable telephone according to the preferred embodiment of the present invention. The case 2 is comprised of a front case 2a and a rear case 2b. A switch panel 16 is fixed to the front case 2a by ultrasonic welding, for example. As best shown in FIG. 4, the switch panel 16 is formed with a plurality of holes 16a through which a plurality of key tops 42 of a key top sheet 28 are to be inserted respectively. The switch panel 16 is further formed with a window 17 for a liquid crystal display.

Reference numeral 18 denotes a transceiver and controller integrated module, which is comprised of a shielding case 20 processed to have a conductivity by forming a metal deposition film or plating film on a surface of a resin mold case, a controller printed circuit board 22 mounted on a front side of the shielding case 20, and a transceiver printed circuit board 26 mounted on a rear side of the shielding case 20. A liquid crystal display 24 is mounted on the controller printed circuit board 22.

The key top sheet 28 is mounted on the controller printed circuit board 22 of the transceiver and controller integrated module 18, and the front case 2a and the rear case 2b are fastened together by screws 30 and 32, thereby constructing the portable telephone.

Figure 5:
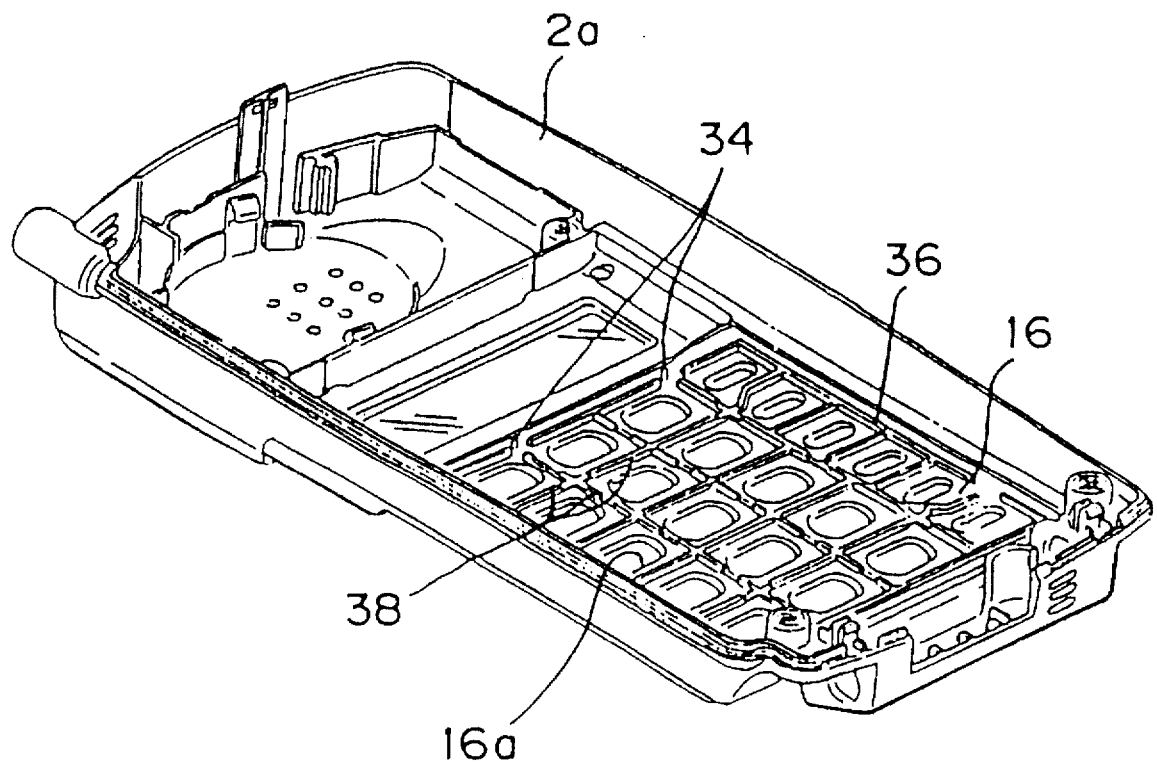
FIG. 5 is a perspective view of the front case with the switch panel mounted thereon as viewed from a back side thereof.

Referring to FIG. 5, there is shown a perspective view of the front case 2a with the switch panel 16 mounted thereon, illustrating a back side of the front case 2a and the switch panel 16. The switch panel 16 is formed of a transparent resin. An inside surface of the switch panel 16 is formed with four positioning bosses 34 adapted to engage small positioning holes of the key top sheet 28. An outer periphery of the inside surface of the switch panel 16 is formed with a rib 36 for guiding the key top sheet 28. Further, the inside surface of the switch panel 16 is formed with a plurality of transparent ribs 38 for light propagation, each surrounding the respective hole 16a of the switch panel 16.

Figure 6:
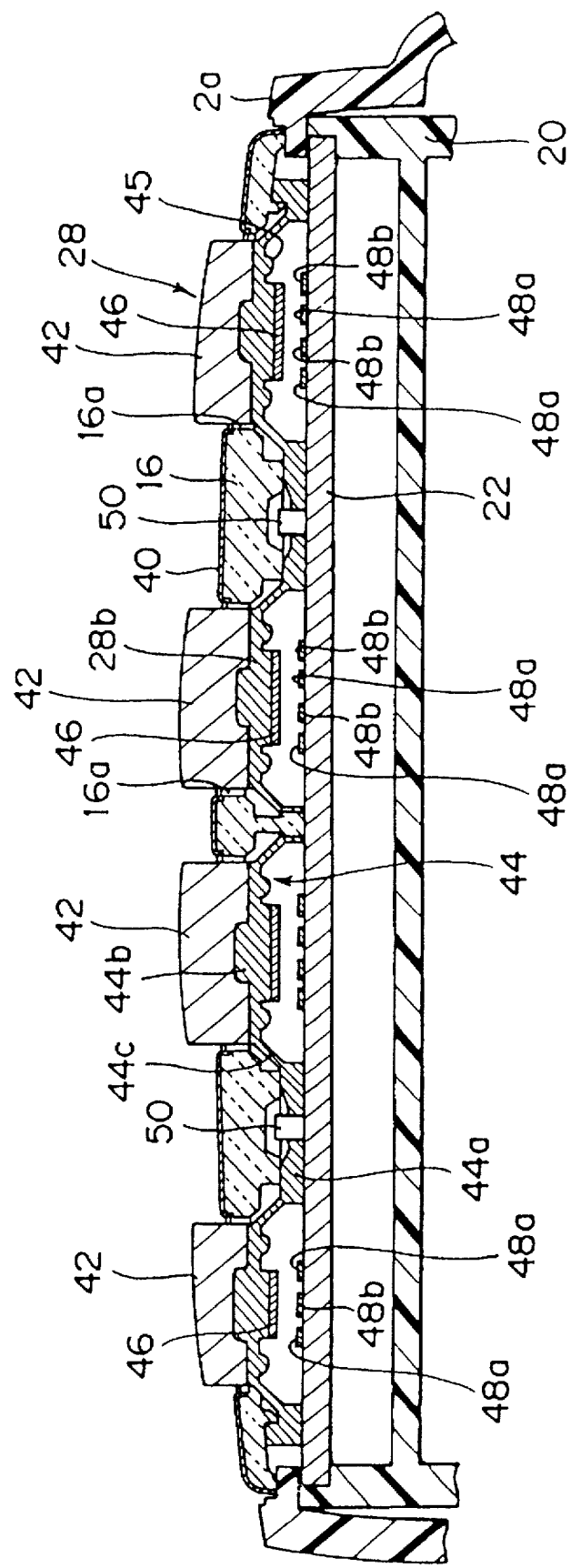
FIG. 6 is a cross section taken along the line 6—6 in FIG. 1.

Now, there will be described a detailed structure of the portable telephone according to the preferred embodiment of the present invention with reference to FIG. 6 showing a cross section taken along the line 6—6 in FIG. 1.

An outside surface of the switch panel 16 is covered with an opaque film 40. The opaque film 40 is formed at the same time when the switch panel 16 is molded by an in-mold process (film transfer molding process).

The opaque film 40 is formed by setting a printed film obtained by gravure printing, silk-screen printing, or combination thereof in a molding die and transferring an ink layer printed on the film onto a surface of a transparent resin filled into the molding die by injection. The ink layer contains an adhesive layer and a top hard coat layer, and it may be constructed as a multilayer consisting of ten layers, for example. Accordingly, the ink layer may be formed as a multicolor layer of combined colors.

As mentioned previously, the switch panel 16 is formed with the plurality of holes 16a through which the respective key tops 42 are to be inserted, and the switch panel 16 is fixed to the front case 2a by ultrasonic welding.

The key top sheet 28 is constructed as an integral sheet formed by fixing the key tops 42, which are translucent, to an opaque sheet member 44. The key top sheet 28 is mounted on the printed circuit board 22 in such a manner that the key tops 42 are inserted through the respective holes 16a of the switch panel 16. The opaque sheet member 44 and the translucent key tops 42 are independently formed from a silicone rubber, for example, and they are integrated together by fusion.

The opaque sheet member 44 of the key top sheet 28 is comprised of a supporting portion 44a contacting the printed circuit board 22, a key top mounting portion 44b spaced a predetermined distance from the printed circuit board 22, and a skirt portion 44c connecting the supporting portion 44a with the key top mounting portion 44b.

A lower surface of the key top mounting portion 44b of the key top sheet 28 corresponding to each key top 42 is formed with a circular projection, and a conductive contact 46 is formed on each circular projection. The formation of the conductive contact 46 may be effected by printing a conductive ink on the circular projection.

The printed circuit board 22 formed with a logic circuit is mounted on the shielding case 20 formed from a resin mold case by processing it to have a conductivity. Conductive switch patterns 48a and 48b are formed on the upper surface of the printed circuit board 22 so as to correspond to each key top 42, that is, so as to face the respective conductive contact 46. The switch patterns 48a and 48b are arranged in an interdigital structure.

When any of the key tops 42 is depressed, the conductive contact 46 corresponding to the depressed key top 42 is brought into contact with the switch patterns 48a and 48b on the printed circuit board 22, so that the switch patterns 48a and 48b are electrically connected together through the conductive contact 46, thus turning on the switch. The lower surface of the key top mounting portion 44b of the key top sheet 28 corresponding to each key top 42 is integrally formed with an annular rib 45 for preventing tilt of the key top 42 in such a manner as to surround the conductive contact 46.

A plurality of light sources 50 such as LEDs are provided on the printed circuit board 22 so as to be fitted with the supporting portion 44a of the key top sheet 28. Light emitted from the light sources 50 is introduced into the switch panel 16 which is formed of a transparent material. The light introduced into the switch panel 16 is reflected on the peripheral surface of the switch panel 16 to propagate in the switch panel 16 and expand horizontally, so that the light operates to illuminate the plurality of key tops 42.

That is, according to this preferred embodiment, the switch panel 16 formed of a transparent material functions as a light guiding board. With this construction, the plurality of key tops 42 can be uniformly illuminated by the small number of light sources 50.

In case of forming the opaque film 40 on the switch panel 16 and the opaque sheet member 44 of the key top sheet 28 from a white opaque material, attenuation of the light from the light sources 50 can be minimized. This construction may be realized by providing two or more white layers in the ink layer of the opaque film 40 formed simultaneously with molding of the switch panel 16 by the in-mold process.

Further, in case of providing a multiple silk layer outside the opaque film 40 formed on the switch panel 16, leakage of the light from an undue portion can be prevented to thereby improve a light shielding performance. Further, in case of forming the ink layer of the opaque film 40 partially from a light transmitting ink, characters and indication formed by the light transmitting ink can be easily recognized even without external illumination as in the night.

According to the present invention, the switch panel is formed of a transparent material, and the outer surface of the switch panel is covered with an opaque film. Accordingly, the switch panel can be employed as a light guiding board, and the plurality of key tops can be efficiently illuminated by the small number of light sources. Furthermore, unlike the conventional structure such that the light guiding board is formed independently of the case, the structure of the present invention enables a portable telephone to be made thin, and a variety of design of the portable telephone can be realized by three-dimensionally developing the in-mold process.

While the invention has been described with reference to the portable telephone, the present invention is not limited thereto but is applicable to other terminal apparatus having key switches as well.

What is claimed is:

1. A terminal apparatus comprising:

a case;

a printed circuit board accommodated in said case and formed with a plurality of switch patterns;

a switch panel fixed to said case, said switch panel having a plurality of holes at positions corresponding to said plurality of switch patterns, said switch panel comprising:

a light conducting transparent portion having an outer surface; and an opaque film formed on the outer surface of said transparent portion so as to be integrated with said transparent portion;

a key top sheet having a plurality of key tops operable by a human user, said key top sheet being mounted on said printed circuit board with said key tops respectively inserted through said holes of said switch panel so that said switch panel and said key tops form outer surface portions of the terminal apparatus when said key tops are being operated by the human user;

a plurality of conductive contacts provided on a lower surface of said key top sheet at positions corresponding to said key tops so as to respectively face said switch patterns with a predetermined distance defined; and a plurality of light sources in visual communication with said switch panel for introducing light into said switch panel to thereby conduct the light to a region of the switch panel through which said key tops are inserted.

2. The terminal apparatus according to claim 1, wherein each of said key tops is formed of a translucent material, and said key top sheet comprises an opaque sheet member and said translucent key tops integrally fixed to said opaque sheet member.

3. The terminal apparatus according to claim 2, wherein said opaque sheet member of said key top sheet comprises a supporting portion contacting said printed circuit board, a key top mounting portion spaced from said printed circuit board, and a skirt portion connecting said supporting portion with said key top mounting portion.

4. The terminal apparatus according to claim 1, wherein said plurality of light sources are LEDs provided in said key top sheet.

5. The terminal apparatus according to claim 1 further comprising a shielding member accommodated in said case, wherein said printed circuit board is mounted on said shielding member.

* * * * *